US009560006B2

(12) United States Patent
Prado et al.

(10) Patent No.: US 9,560,006 B2
(45) Date of Patent: Jan. 31, 2017

(54) METHOD AND APPARATUS FOR EXPIRING MESSAGES IN ELECTRONIC COMMUNICATIONS

(75) Inventors: Jason Prado, Mountain View, CA (US); Benjamin David Eidelson, Mountain View, CA (US); Peter Michal Pawlowski, Mountain View, CA (US); Doug Sherrets, Mountain View, CA (US)

(73) Assignee: Google Inc., Mountain View, CA (US)

( * ) Notice: Subject to any disclaimer, the term of this patent is extended or adjusted under 35 U.S.C. 154(b) by 408 days.

(21) Appl. No.: 13/558,916

(22) Filed: Jul. 26, 2012

(65) Prior Publication Data

US 2014/0032682 A1    Jan. 30, 2014

(51) Int. Cl.
*G06F 15/16* (2006.01)
*H04L 12/58* (2006.01)
*H04W 12/04* (2009.01)

(52) U.S. Cl.
CPC ............ *H04L 51/34* (2013.01); *H04L 51/18* (2013.01); *H04W 12/04* (2013.01)

(58) Field of Classification Search
CPC .... H04L 51/14; H04L 12/5835; H04L 51/066; H04L 67/325
USPC ........................................................ 709/206
See application file for complete search history.

(56) References Cited

U.S. PATENT DOCUMENTS

| | | | |
|---|---|---|---|
| 6,195,683 B1 * | 2/2001 | Palmer et al. | 709/204 |
| 6,721,784 B1 | 4/2004 | Leonard et al. | |
| 7,035,904 B1 | 4/2006 | Jordan, Jr. | |
| 7,149,893 B1 | 12/2006 | Leonard et al. | |
| 7,483,943 B2 * | 1/2009 | Kakivaya et al. | 709/203 |
| 7,496,631 B2 | 2/2009 | Austin-Lane et al. | |
| 7,640,307 B2 * | 12/2009 | Daniels et al. | 709/206 |
| 7,797,390 B2 | 9/2010 | Hagale et al. | |
| 7,818,376 B2 | 10/2010 | Galli et al. | |
| 8,086,672 B2 | 12/2011 | Horvitz | |
| 2002/0120869 A1 * | 8/2002 | Engstrom | 713/201 |
| 2004/0059790 A1 | 3/2004 | Austin-Lane et al. | |
| 2005/0021984 A1 * | 1/2005 | Hollander | 713/186 |

(Continued)

FOREIGN PATENT DOCUMENTS

WO     01/50291 A1    7/2001
WO    2006/005814 A1  1/2006

OTHER PUBLICATIONS

USPTO, International Search Report in International Application No. PCT/US2013/051876, Aug. 15, 2013, 2 pp.

(Continued)

*Primary Examiner* — Richard G Keehn
(74) *Attorney, Agent, or Firm* — IP Spring

(57) ABSTRACT

The present disclosure includes systems and methods for off-the-record communication including expiring messages. An example method comprises receiving an electronic communication from a source device, the electronic communication including at least one expiring message, temporarily storing content of the expiring message in a non-durable memory for a predetermined amount of time, durably storing envelope information associated with the expiring message in a durable memory, and determining whether a recipient device for the expiring message is available to accept transmission of the expiring message and determining whether an expiration event has occurred.

17 Claims, 11 Drawing Sheets

(56) References Cited

U.S. PATENT DOCUMENTS

| | | | |
|---|---|---|---|
| 2006/0031348 A1* | 2/2006 | Fox | 709/206 |
| 2006/0149822 A1 | 7/2006 | Henry et al. | |
| 2007/0174404 A1* | 7/2007 | Hui et al. | 709/207 |
| 2007/0180028 A1* | 8/2007 | Chen et al. | 709/204 |
| 2008/0016575 A1 | 1/2008 | Vincent et al. | |
| 2008/0026776 A1 | 1/2008 | Neil et al. | |
| 2008/0046584 A1* | 2/2008 | Tucker | 709/231 |
| 2008/0109518 A1* | 5/2008 | Wilson et al. | 709/206 |
| 2008/0320417 A1* | 12/2008 | Begley et al. | 715/822 |
| 2009/0042588 A1 | 2/2009 | Lottin et al. | |
| 2010/0094809 A1 | 4/2010 | Consul et al. | |
| 2010/0304766 A1 | 12/2010 | Goyal | |

OTHER PUBLICATIONS

USPTO, Written Opinion in International Application No. PCT/US2013/051876, Aug. 15, 2013, 8 pp.
IP Australia, Examination Report for Australian Patent Application No. 2013295796, Nov. 11, 2015, 2 pages.
International Bureau of WIPO, International Preliminary Report on Patentability in International Patent Application PCT/US2013/051876 (Feb. 5, 2015).
IP Australia, Notice of Acceptance for Australian Patent Application No. 2013295796, Jul. 15, 2016, 2 pages.
European Patent Office, Extended Search for European Patent Application No. 13823385.3, Feb. 23, 2016, 9 pages.
CIPO, Office Action for Canadian Patent Application No. 2,919,450, Nov. 8, 2016, 4 pages.

* cited by examiner

METHOD AND APPARATUS FOR EXPIRING MESSAGES IN ELECTRONIC COMMUNICATIONS

BACKGROUND

Typical electronic communications, such as email, text messages, tweets, etc. are on-the-record and their content may be saved in permanent (i.e., durable) storage at multiple server locations. For example, in the case of an email, the email may be saved at an email exchange server maintained by the service provider. Thus, even if the sender and the recipient wish the communication to be deleted or ephemeral in nature, this is not possible. The message usually may always be recovered.

In situations where the participants in a conversation wish the content of certain electronic messages to be maintained as private and ephemeral communications, there are conventional services supporting off-the-record chats. In some such instances, the chat messages are not stored by the service provider hosting the service. The communications are facilitated by the service provider simply by forwarding chat messages back and forth between logged in participants. Because messages are not stored in such off-the-record communications services, an intended recipient must be connected to the service at the time the message is transmitted for the message to be delivered.

Off-the-record communications can be very sensitive and important to those involved. They may be part of a discussion leading to a decision to be made by the participants. Information critical to the decision-making process may be exchanged in a series of back-and-forth communications before a decision is made. Sometimes the back-and-forth may last for a prolonged period. Thus, it can be critical that each participant know about all of the prior communications. Missing a communication can lead to misunderstandings and bad decision making. Alternatively, communications among some but not all of the participants can generate uncertainty and potentially mistrust.

As noted, conventional off-the-record systems and methods require receiving parties to be "online" during the conversation. In the case where a recipient device is not connected, such as due to a plane trip or the like, a critical message might never be received and the intended recipient might never be informed that they missed an off-the-record communication. As far as they would be able to determine, there would have not been any missed communications while the recipient device was off-line.

Conventional systems fail to recognize these significant problems and fail to offer any reasonable solutions. Consequently, such conventional systems are flawed in their operation and usefulness. The deficiencies in such conventional systems and methods are exacerbated because some mechanisms for communication, such as mobile devices (e.g., smart phones) are often offline making the conventional off-the-record communications ineffective and unreliable.

Consequently, there is a need for systems and methods supporting electronic communications with expiring messages that maintain the content of a private message for varying amount of times in order to increase the likelihood that the content is delivered to the desired recipient device, while ensuring that the content is ephemeral and not susceptible to future discovery.

SUMMARY

The present disclosure includes a method of off-the-record communication at a server including expiring messages comprising receiving an electronic communication from a source device, the electronic communication including at least one expiring message, temporarily storing content of the expiring message in a non-durable memory for a predetermined amount of time, durably storing envelope information associated with the expiring message in a durable memory, and determining whether a recipient device for the expiring message is available to accept transmission of the expiring message and determining whether an expiration event has occurred.

The method further includes, depending on whether the expiring event has occurred, transmitting information including one of the content of the expiring message to the recipient device when the recipient device is available to accept transmission of the expiring message before the expiration event has occurred, and the envelope information of the expiring message to the recipient device when the recipient device is available to accept transmission of the expiring message after the expiration event has occurred.

In some instances, the elapsing of a predetermined time to live, which indicates an amount of time the content of the expiring message is stored at the server, is considered an expiration event. In other instances, viewing the expiring message a predetermined number of times is considered an expiration event. Additionally, the content of the expiring message may be permanently deleted from the server after the expiration event has occurred.

Envelope information may comprise any descriptive information pertaining to aspects or properties of the message. For example, the envelope information may comprise information indicating a source of the expiring message, and time of transmission of the expiring message by the source device. Alternatively, the envelope information may consist of the time of transmission by the source device of the expiring message.

The disclosure also includes a system for off-the-record communication including expiring messages comprising first and second client devices configured to transmit and receive electronic communications including at least one expiring message, a server comprising a reception unit configured to receive the expiring message from the first client device, a transmission unit configured to transmit the expiring message to the second client device, a non-durable memory medium connected to the reception unit and configured to temporarily store content of the expiring message, and a durable memory medium connected to the reception unit and the transmission unit and configured to durably store envelope information associated with the expiring message.

In this embodiment, the content of the expiring message is temporarily stored in the non-durable memory until occurrence of an expiration event, and the content of the expiring message is permanently deleted from the server upon occurrence of the expiration event. In some instances, the second client device comprises a storage medium for temporarily storing the content of the expiring message, and the content of the expiring message is permanently deleted from the storage medium after the expiration event has occurred.

The expiration event may be the expiration of a predetermined time to live indicating an amount of time the content of the expiring message is stored at the server. Alternatively, the expiration event may be viewing the content of the expiring message a predetermined number of times by the second client device.

Envelope information may comprise any descriptive information pertaining to aspects or properties of the message. In some instances, the envelope information consists of the time of transmission by the first client device of the expiring message. In other instances the envelope information comprises information indicating a source of the expiring message, time of transmission of the expiring message by the first client device, and a predetermined time to live indicating an amount of time content of the expiring message is stored at the server.

The disclosure further includes a method of off-the-record communication at a client including expiring messages comprising establishing a communication connection with a server, and receiving from the server an electronic communication pertaining to an expiring message, the expiring message including a predetermined time to live indicative of an amount of time that content of the expiring message is stored at the server, wherein, depending on the predetermined time to live, the electronic communication received from the server is one of the content of the expiring message indicative of what was stored at the server, and a notification that the content of the expiring message has expired as a result of the predetermined time to live having passed.

DETAILED DESCRIPTION OF EXAMPLE EMBODIMENTS

Figure 1:
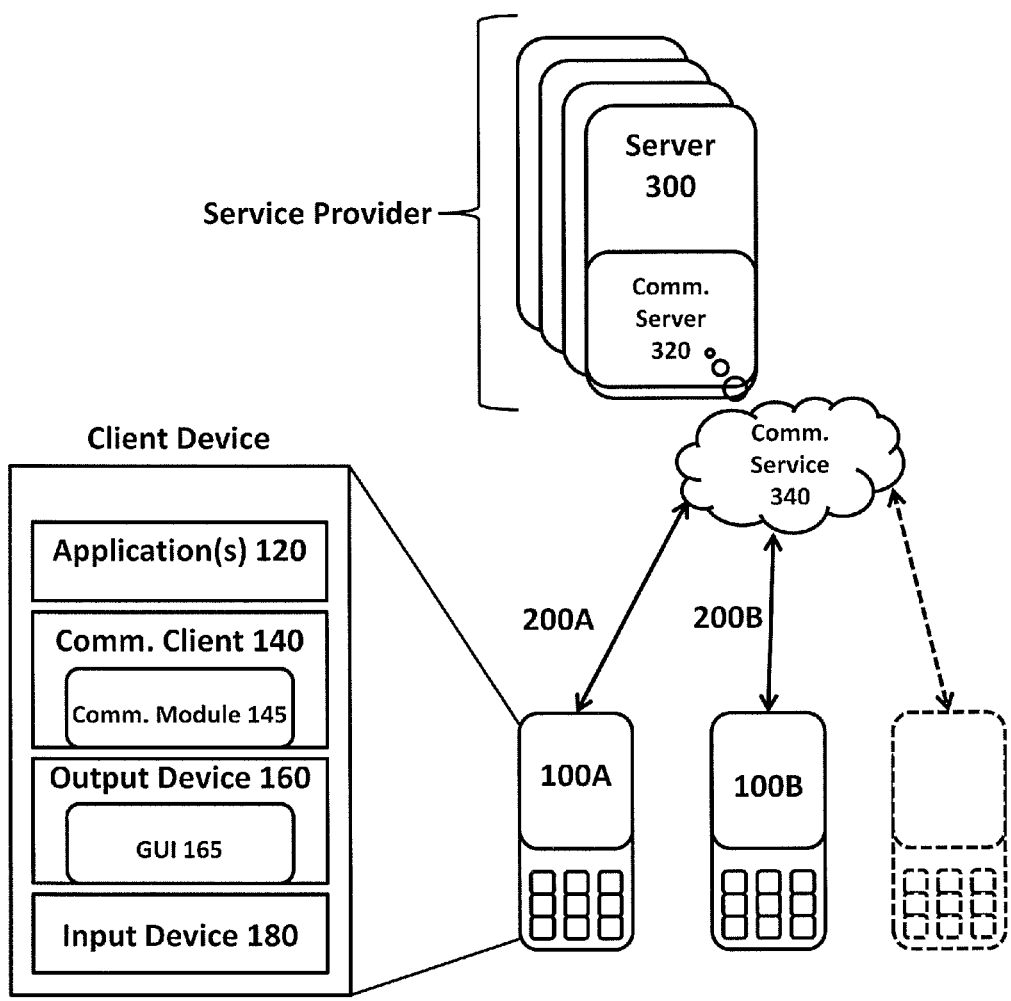
FIG. 1 is a block diagram of an example system supporting off-the-record communications, including at least two client devices interacting through a common communications service hosted by a service provider.

In an example embodiment, an electronic communication service provider may host one or more different types of electronic communication services facilitating on-the-record and off-the-record communications among users. The communication services may support active communications between concurrently on-line and participating users. Examples of such active communications may include, but are not limited to instant messaging chat sessions, telephone conversations, video teleconferences, etc., some of which may be on-the-record and some of which may be off-the-record. The communication services may also include messaging services supporting the exchange of one or more discrete messages, such as text messages, emails, and the like, which are on-the-record. Concurrent participation and connection to the communication service by the users are not required to exchange one or more on-the-record discrete messages.

In such example embodiment, a method and system is included which provides for expiring messages that are off-the-record. An expiring message may include an electronic communication with content that has a finite existence and is not permanently (i.e., durably, even over an extended time) maintained in storage, e.g., at the servers of the service provider. Thus, in the context of such an electronic communication, the content of an expiring message in such example is not permanently stored on durable computer readable media. Generally, the content of such an expiring message is temporarily stored on computer readable media and is deleted, removed, extinguished, etc. upon the occurrence or shortly after the occurrence of an expiration event.

In another example embodiment, an expiring message includes an electronic communication with content that becomes incomprehensible on or shortly after the occurrence of an expiration event. In this example, the method and system use an encryption algorithm to encrypt the content of the expiring message and generate an encryption key that can be used to decrypt the content. An example encryption algorithm is a rotating key encryption algorithm. Key generation and/or rotation may be random. The encrypted content of the message may be either permanently or temporarily maintained. However, in this example case, the encryption key associated with the encrypted content has a finite existence and is not permanently maintained in storage, e.g., it is not permanently stored on durable computer readable media. At any time between encrypting the expiring message content and the occurrence (or shortly after) of an expiration event associated with the expiring message, the encryption algorithm rotates, e.g., changes, the encryption key. In this example, the occurrence (or shortly after) of an expiration event also triggers the deletion of the encryption key associated with encrypted content, making the content incomprehensible because it cannot be decrypted. In some instances, the sending user device may define a user friendly passcode to activate the key decryption. The passcode may be transmitted to the user in any acceptable manner such as by voice, electronic message, etc. The encrypted message content may also be deleted upon or shortly after the occurrence of an expiration event.

An example of an expiration event includes, but is not limited to, the passage of a predetermined amount of time, which may be referred to as a time to live (TTL). Additionally, accessing an expiring message's content a predetermined number of times, i.e., allowing a user to access or view the content of the expiring message a finite number of times, may be considered a predetermined expiration event. Expiration events are not limited to the aforementioned events and may include any conceivable event that is desired to trigger deletion of the content of an electronic message and/or an encryption key associated with the content of an electronic message. Additionally, more than one expiration event may be associated with a single expiring message. In this scenario, the first expiration event to occur triggers deletion of the message's content (and/or encryption key). In some instances, the source of the expiring message, i.e., the party that initiates, composes, and sends the expiring message, predefines the expiration event. For example, the party initiating the electronic communication may set the TTL of the message content as a specific amount of time (e.g., 6 hours) after transmission of the expiring message. In other instances, the expiration event may be defined by the service provider, e.g., after access by the recipient. In some instances, the service provider may use a default amount of time as the TTL for the message content of all expiring messages routed through its communications services, or a combination of number access instances and TTL or the like.

In some example embodiments, expiring messages include descriptive information in addition to message content. The descriptive information pertains to certain aspects or properties of the message, such as information identifying the message as an expiring message (e.g., an expiring message designator), information identifying the source of the message (e.g., a username associated with the sender), information identifying the destination of the message (e.g., username, email address, telephone number, Jabber ID (JID), uniform resource identifier (URI), uniform resource locator (URL), etc. associated with the intended recipient), the time and date of message creation, the time and date of message transmission, information describing an expiration event (e.g., a predetermined TTL), and the like. In some embodiments, the descriptive information is organized into a header of the expiring message. Additionally, the descriptive information may be referred to as "envelope information", "record", and/or "metadata".

In some example embodiments, a system for off-the-record communications includes at least two clients and a server. The server resides at a service provider and hosts one or more communications services. Each client can connect to and interact with the communications services hosted by the service provider. For example, the clients can connect to a mobile chat hosted by the service provider. Additionally, the clients can send and receive off-the-record electronic communications that include expiring messages. In this embodiment, a first client ("sending" or "source" client) initiates, composes, and transmits an expiring message addressed in a manner to be available to a second client ("receiving" or "destination" client). Transmission of the expiring message from the source client to the destination client is achieved by routing the expiring message through the server and delivering the expiring message to the destination client when the destination client is able and willing to accept delivery. In some embodiments, the source client displays an icon or other visual representing an expiration event associated with the expiring message (e.g., a clock icon indicating a time to live) after transmitting the message.

When an expiring message in this example is received by the server, the content of the expiring message is stored in non-durable (e.g., volatile) memory and an envelope record of the message is stored in durable (e.g., non-volatile) memory. The envelope record does not include the content of the expiring message, only descriptive information (e.g., envelope information). In some instances, the service provider parses the envelope information to determine one or more expiration events defined by the source client. In other instances, the service provider assigns one or more expiration events to the expiring message. The server of this example thereafter monitors the expiring message and deletes the message content as or shortly after the expiration event occurs regardless of whether the expiring message is ever transmitted or accessed by the destination client.

In another embodiment, when an expiring message is received by the server, an encryption key associated with encrypted message content is stored in non-durable memory, an envelope record of the message is stored in durable memory, and encrypted message content is stored in either durable or non-durable memory. In one instance, the server receives an expiring message, applies an encryption algorithm to encrypt the message's content, generates an encryption key that can be used to decrypt the encrypted content, and then performs the aforementioned storage. In another instance, the encryption algorithm is applied and the encryption key is generated at the source client device, whereby the server receives the expiring message (including the encryption key and the encrypted message content) from the source client device and performs the aforementioned storage. In either instance, the server monitors the expiring message and deletes the encryption key associated with the encrypted message content as or shortly after the expiration event occurs regardless of whether the expiring message is ever transmitted or accessed by the destination client. In this embodiment, if the destination client device receives the expiring message before the occurrence of an expiration event, it can use the encryption key to decrypt the encrypted message content and view the message content. In some instances, the source client device may designate a user friendly passcode to activate the decryption. Such passcode may be set by the user or may be randomly generated by the server or other devices.

While an expiring message is awaiting transmission at the server, the service provider either determines or is notified of the destination client's ability and willingness to connect to the service (such as mobile chat) and receive messages. In the situation where the destination client is available and willing to receive the expiring message before an expiration event associated with the expiring message occurs, the server transmits the expiring message to the destination client. In some instances the expiring message includes an encryption key and encrypted message content. Thereafter, the destination client may temporarily access and review the content of the message. In some embodiments, the source client is notified when the expiring message is delivered to the destination client. The destination client may display an icon or other visual representing an expiration event associated with the expiring message (e.g., a clock icon indicating a time to live). In this situation, when an expiration event associated with the expiring message occurs, both the server and the destination client permanently delete the content (and/or the encryption key) of the expiring message, retaining access to only the envelope record of the expiring message.

When the destination client is not available or is otherwise unwilling to receive delivery of the expiring message before an expiration event associated with the message occurs, the content (and/or the encryption key) of the message is permanently deleted from the server without transmission to the destination client. By way of example, the destination client may be unavailable due to travelling outside the service provider's coverage zone, interruption in service, loss of power, and the like. Upon subsequent connection to the service provider (indicating ability and willingness to communicate), a notification is sent to the destination client providing the envelope information or the like indicating that a message was sent from the source client but failed to be delivered.

Figure 2:
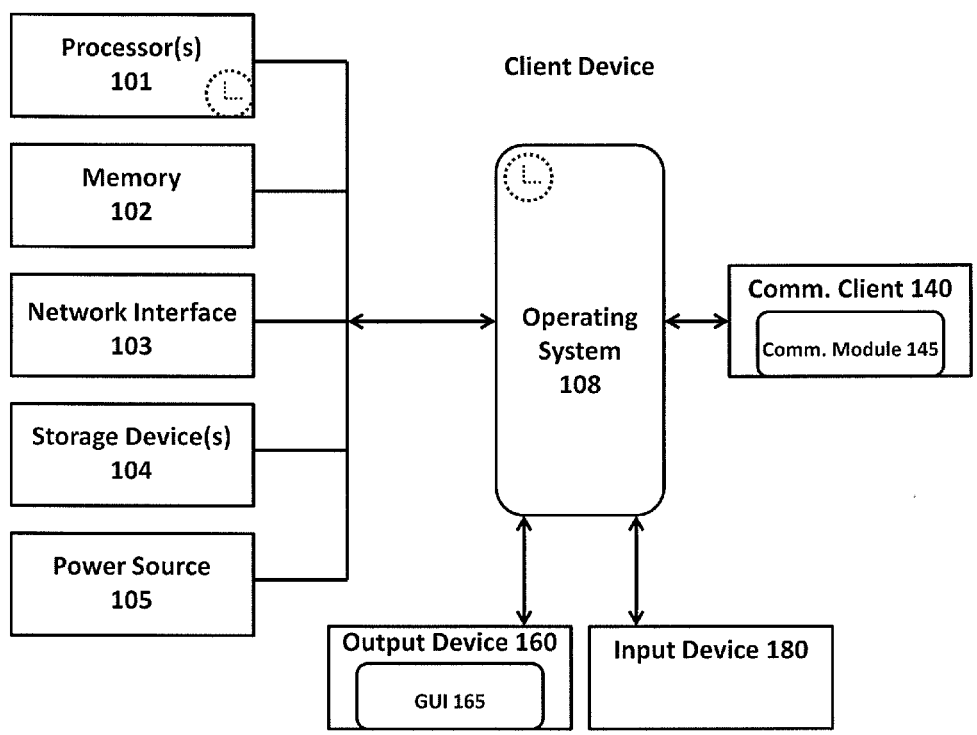
FIG. 2 is a block diagram of basic functional components of an example system for one of the client devices in FIG. 1.
Figure 3:
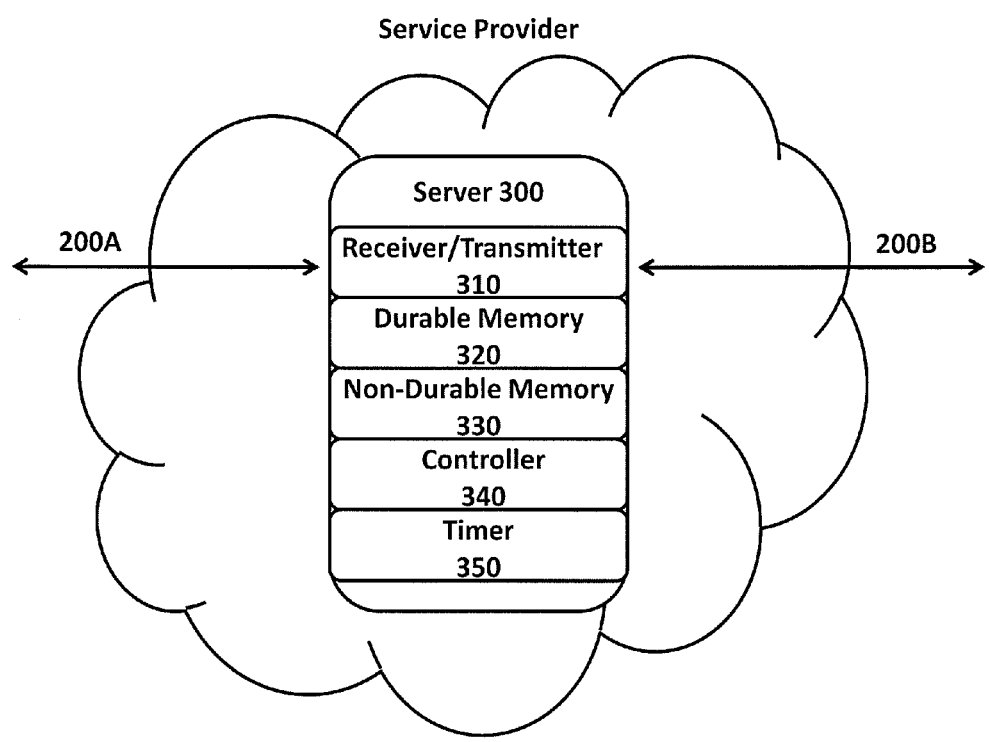
FIG. 3 is a block diagram of the basic functional components of an example system for a server hosting off-the-record communications.

An example communications environment supporting off-the-record communications is described in detail with respect to FIGS. 1-3. In some example embodiments, the communications environment provides multimedia communications services supporting multimedia communications. The illustrated environment is presented as an example, and does not imply any limitation regarding the use of other group networking environments. To the contrary, the description contemplates all implementations of communications environments that support off-the-record communications that include expiring messages.

Turning to FIG. 1, example client devices 100A and 100B are connected to a service provider supporting a communications environment that facilitates off-the-record communications among the client devices 100A and 100B. Example client devices 100A and 100B include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, the client devices 100A and B may be connected in the same manner to a communications session. Alternatively, the client devices 100A and 100B establish different types of connections. In some instances, the client devices 100A and 100B include similar communications mechanisms. For example, the client devices 100A and 100B may both be mobile telephones. In other embodiments, the client devices 100 and 100B are different types of devices. For example, the client device 100A may be a mobile telephone and the client device 100B may be a desktop computer or other client residing on and powered by programmed logic circuits. In some instances, the service provider supports off-the-record communications among more than two client devices (illustrated by the dash-lined client device of FIG. 1).

In the embodiment illustrated by FIG. 1, the client device 100A communicates with server 300 via a communications channel 200A. The communications channel typically includes an Internet or mobile communication connection between the client 100A and the server 300 but could be established by other such communications circuits such closed networks, etc. The server 300 often comprises multiple physical servers such as a communications server 320 for maintaining or "hosting" one or more communications services. Of course, each server can be a physically separate machine or it can be different processes running within the same physical machine. The server 300 may include a plurality of interconnected devices maintained at one or more physical locations, all acting as a unitary service provider as described herein. In this embodiment, the server 300 is maintained by a service provider in order to facilitate communication and interaction among individuals, e.g., users of the client devices 100A and 100B.

In an alternative example embodiment, the client device 100A maintains, hosts, or establishes a communications service and other client devices, such as the client device 100B in FIG. 1, are routed to the communications service at the client device 100A by server 300 or the like. Additionally, in this scenario, a plurality of client devices may run one or more processes that enable formation of an ad hoc network to facilitate off-the-record communications when connection to a service provider is not feasible or undesirable.

Communications services at the communications server 320 are supported by an environment defined by a runtime engine executing at the server 300. For example, the runtime engine may be Google's "App Engine." The runtime engine provides the platform for the communications service and supplies resources required for user interaction. The resources of the application engine are available to the communications service by way of an application programming interface (API) or other connecting application, transferring protocol or the like. In some instances, multimedia streams are distributed by reflectors distributing combined signals in various protocols such as real time protocol (RTP).

In some embodiments, communications services, such as communications service 340 of FIG. 1, support active message exchange between concurrently participating client devices. Examples of active message exchange between concurrently participating client devices include, but are not limited to, an instant messaging chat session, a telephone conversation, and a video teleconference. In other embodiments, communications services facilitate the exchange of one or more discrete messages between client devices, such as a text message exchange and the like. In these embodiments, concurrent participation and connection to the communication service among client devices may not be required.

The client device 100A of FIG. 1 includes application(s) 120, communications client 140, output device 160 (e.g., a display), and input device 180 (e.g., keyboard, mouse, touch screen). Application(s) 120 provide the client device 100 with a variety of functionality. Generally, application(s) 120 employ the output device 160 to display information at a graphical user interface (GUI) 165 and the input device 180 to accept and respond to user input. The application(s) 120 may include, but are not limited to, an email client, an instant messaging client, a text messaging client, a video conferencing client (e.g., Google+ Hangouts), an Internet browser, and/or the like. Additionally, application(s) 120 may include an encryption algorithm, e.g., a rotating key encryption algorithm, to encrypt and/or decrypt data residing at the client device 100A, automatically or upon the providing of a passcode. In some embodiments, the application(s) 120 reside at a location external to the client devices. The client device 100B of FIG. 1 may include the same or similar features as the client device 100A.

The communications client 140 further includes a communications module 145 that enables output device 160 to display information at the GUI 165. The communications module 145 also enables the communications client 140 to connect to the communications server 320, allowing a user of the client device 100A in FIG. 1 to use one or more communications services. Typically, the communications module 145 is a network module that connects the client device 100A to a network such as the Internet using network protocol techniques including, by way of example, transmission control protocols and internet protocols. In this manner multiple client devices, e.g., 100A and 100B, may join or connect to the same communications service 340 hosted at the communications server 320. In some embodiments, the communications client 140 and/or the communications module 145 at the client device 100A enables the user to reside in a location where other client devices may join and communicate. In other instances, the communications client 140 and/or the communications module 145 enables the user to post or upload a message for a specified recipient, who may or may not be concurrently connected to the service provider.

Once connection to a communications service 340 is established, a communications channel, e.g., channel 200A, between the communications client 140 and the communications server 320 exchanges data, such as audio, video, text, and/or other information. In some embodiments, the data exchanged between the communications client 140 and the communications server 320 is optimized based, at least in part, on the hardware and/or software capabilities of client device 100A. For example, if the client device 100A is a mobile device connecting to the communications service 340 by way of a bandwidth limited path such as a cellular network, communications server 320 may optimize the number and quality of the audio, video, text, and/or other information sent to the client device 100A. Furthermore, the communications client 140 may dynamically adjust the bit rate required to send the information to the communications server 320 by, for example, reducing the quality of the audio, video, text, and/or other information being sent to the communications server 320.

GUI 165 is an illustrative example of a GUI from which connection to a communications service may be initiated and sustained. In some embodiments, GUI 165 includes information about one or more other client devices connected to the communications service 340. The GUI may also include notifications of events and other information relevant to the user of the client device 100A.

In order to establish a connection to a communications service, a user of client device 100A interacts with the input device 180 and/or the GUI 165 to cause the communications client 140 to generate a request to connect to the communications service. For example, GUI 165 may include a "New Message" button that the user activates in order to initiate a new connection to a service hosted by the service provider. In response to the user activating the New Message button, communications client 140 sends a request to initiate a new connection with the communications service 340 to the communications server 320, which establishes the new connection. Thereafter, the communications server 320 facilitates communications, including off-the-record communications, between the client device 100A and one or more other client devices, e.g., the client device 100B.

In some embodiments, the client device 100A is automatically prompted or notified of existing communications by the service provider upon establishing a connection to the service provider. In this example embodiment, one or more discrete messages reside at the service provider, e.g., on the server 300, intended for the user of the client device 100A. Upon connection of the client device 100A to the communications service 340, the server notifies the user of the messages. Additionally, the server may automatically push the messages to the client device 100A.

Referring now to FIG. 2, one example of the client device 100A is illustrated. In general, many other embodiments of the client device 100A may be used as long as they support at least limited participation in the communications sessions, including off-the-record communications. In the example embodiment of FIG. 2, the client device 100A includes one or more processors 101, memory 102, network interface 103, one or more storage devices 104, power source 105, output device 160, and input device 180. The client device 100A also includes an operating system 108 and a communications client 140 that are executable by the client device 100. In a conventional fashion, each of components 101, 102, 103, 104, 105, 160, 180, 108, and 140 are interconnected physically, communicatively, and/or operatively for inter-component communications. The processors 101 and/or the operating system 108 may include or be associated with a system clock.

As illustrated, the processor(s) 101 are configured to implement functionality and/or process instructions for execution within the client device 100A. For example, the processor(s) 101 execute instructions stored in the memory 102 or instructions stored on the storage devices 104. The memory 102, which may be a non-transient, computer-readable storage medium, is configured to store information within client device 100 during operation. In some embodiments, the memory 102 includes a temporary memory, area for information not to be maintained when the client device 100A is turned off. Examples of such temporary memory include volatile memories such as random access memories (RAM), dynamic random access memories (DRAM), and static random access memories (SRAM). The memory 102 maintains program instructions for execution by the processor(s) 101.

The storage device(s) 104 also include one or more non-transient computer-readable storage media. The storage device(s) 104 are generally configured to store larger amounts of information than the memory 102. The storage device(s) 104 may further be configured for long-term storage of information. In some examples, the storage device(s) 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100A uses the network interface 103 to communicate with external devices via one or more networks, such as one or more wireless networks. The network interface 103 may be a network interface card, such as an Ethernet card, an optical transceiver, a radio frequency transceiver, or any other type of device that can send and receive information. Other non-limiting examples of network interfaces include Bluetooth®, 3G, 4G, and WiFi® radios in mobile computing devices, and universal serial bus (USB). In some embodiments, the client device 100A uses the network interface 103 to wirelessly communicate with an external device such as the server 300 of FIG. 1, a mobile phone, or other networked computing device.

The client device 100A includes one or more input devices 180. The input device 180 is configured to receive input from a user through tactile, audio, and/or video feedback. Non-limiting examples of the input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 160 are also included in client device 100A. The output device 160 is configured to provide output to a user using tactile, audio, and/or video stimuli. The output device 160 may include a display screen (part of the presence-sensitive screen), a sound card, a video graphics adapter card, or any other type of device for converting a signal into an appropriate form understandable to humans or machines. Additional examples of the output device 160 include a speaker, a cathode ray tube (CRT) monitor, a liquid crystal display (LCD), or any other type of device that can generate intelligible output to a user.

The client device 100A includes one or more power sources 105 to provide power to the client. Examples of the power source 105 include single-use power sources, rechargeable power sources, and/or power sources developed from nickel-cadmium, lithium-ion, or other suitable material.

The client device 100A includes an operating system 108 such as the Android® operating system. The operating system 108 controls operations of the components of the client device 100A. For example, the operating system 108 facilitates the interaction of the communications client 140 with the processor(s) 101, memory 102, network interface 103, storage device(s) 104, input device 180, output device 160, and the power source 105. As illustrated in FIG. 2, the communications client 140 includes the communications module 145. Each of the communications client 140 and the communications module 145 typically includes program instructions and/or data that are executable by the client device 100. For example, in one example embodiment communications module 145 includes instructions causing the communications client 140 executing on the client device 100A to perform one or more of the operations and actions described in the present disclosure.

In some example embodiments, the communications client 140 and/or communications module 145 form a part of operating system 108 executing on the client device 100A. In other embodiments, the communications client 140 receives input from one or more of the input devices 180 of the client device 100A. The communications client 140 preferably receives textual, audio, and video information associated with a communications service 340 from other client devices communicating via the communications service. In some instances the communications client 140 and/or communications module 145 may include an email client, an instant messaging client, a text messaging client, a video conferencing client (e.g., Google+ Hangouts), an Internet browser, and/or the like.

Turning to FIG. 3, one example of a server facilitating off-the-record communications is illustrated. The server 300 includes receiver/transmitter 310, durable memory 320, non-durable memory 330, controller 340, and timer 350. In general, the controller 340 controls the overall operation of the server 300. Additionally, the controller may interact with one or more applications to apply an encryption algorithm, such as a rotating key encryption algorithm, to data residing at the server. The units 310-350 of the server 300 may be implemented in a single programmed logic circuit residing at a single physical location or separate programmed logic circuits residing at one or more physical locations. Alternatively, the units 310-350 may be implemented as one or more modules residing on non-transitory computer readable media. In some instances, the server 300 of FIG. 3 additionally includes all of the functionality previously described in accordance with the server 300 of FIG. 1.

The receiver/transmitter 310 of FIG. 3 facilitates the exchange of data between the server 300 and one or more client devices, including the exchange of off-the-record communications and expiring messages. The receiver/transmitter 310 may include a network interface to communicate with external devices via one or more networks, such as one or more wireless networks. The network interface may be a network interface card, such as an Ethernet card, an optical transceiver, a radio frequency transceiver, or any other type of device that can send and receive information. Other non-limiting examples of network interfaces include Bluetooth®, 3G, 4G, and WiFi® radios in mobile computing devices, and universal serial bus (USB). In some embodiments, the receiver/transmitter 310 uses the network interface to wirelessly communicate with an external device such as the client device 100A of FIG. 1. In other embodiments, the receiver/transmitter 310 uses the network interface to communicate with an external device over a wired connection.

In some embodiments, a client device initiates a connection to a communications service hosted by the server 300 by sending a request to connect to the server 300. The request to connect is received by the receiver/transmitter 310 and processed to establish the connection. Once connection to the server 300 and/or a specific communications service hosted by the server 300 is established, the receiver/transmitter 310 exchanges data with the client device via a communications channel, e.g., channel 200A. In other embodiments, the server 300 attempts to initiate a connection to a client device by sending a query via the receiver/transmitter 310 to the client device to determine the ability and willingness of the client device to communicate. When the client device is able and willing to communicate, a communications channel is established between the client device and the receiver/transmitter 310 of the server 300.

The durable memory 320 includes one or more non-transient computer-readable storage media. The durable memory 320 is generally configured to store larger amounts of information than the non-durable memory 330 (described below). The durable memory 320 may further be configured for long-term storage of information. In some examples, the durable memory 320 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories. In some embodiments of the communications environment supporting off-the-record communications of FIGS. 1-3, a record, e.g., envelope information, of an expiring message is permanently (i.e., durably) stored by the durable memory 320 when the server 300 receives the expiring message. In one example embodiment, the content of an expiring message is temporarily stored in the durable memory 320. In another example embodiment, encrypted message content of an expiring message is stored in the durable memory 320.

Non-durable memory 330 also includes one or more non-transient, computer-readable storage media. In some embodiments, the non-durable memory 330 includes a temporary memory, i.e., an area for information not to be maintained when the server 300 is turned off. Examples of such temporary memory include volatile memories such as random access memories (RAM), dynamic random access memories (DRAM), and static random access memories (SRAM). In some embodiments of the communications environment supporting off-the-record communications of FIGS. 1-3, content (which may be encrypted) of an expiring message is temporarily stored by the non-durable memory 330 when the server 300 receives the expiring message. In some instances, an encryption key associated with the content of an expiring message is temporarily stored by the non-durable memory 330.

The server 300 of FIG. 3 also includes a timer 350. The timer 350 is any device for calculating or measuring the passage of time. In some embodiments, the timer 350 also informs the server 300 of the current date and time. In some instances, the server 300 uses the timer 350 to monitor an expiring message to determine whether an expiration event has occurred. For example, the time 350 can be used to determine whether a TTL associated with an expiring message has passed. In one embodiment, the timer 350 is a system clock associated with the server 300.

Figure 4:
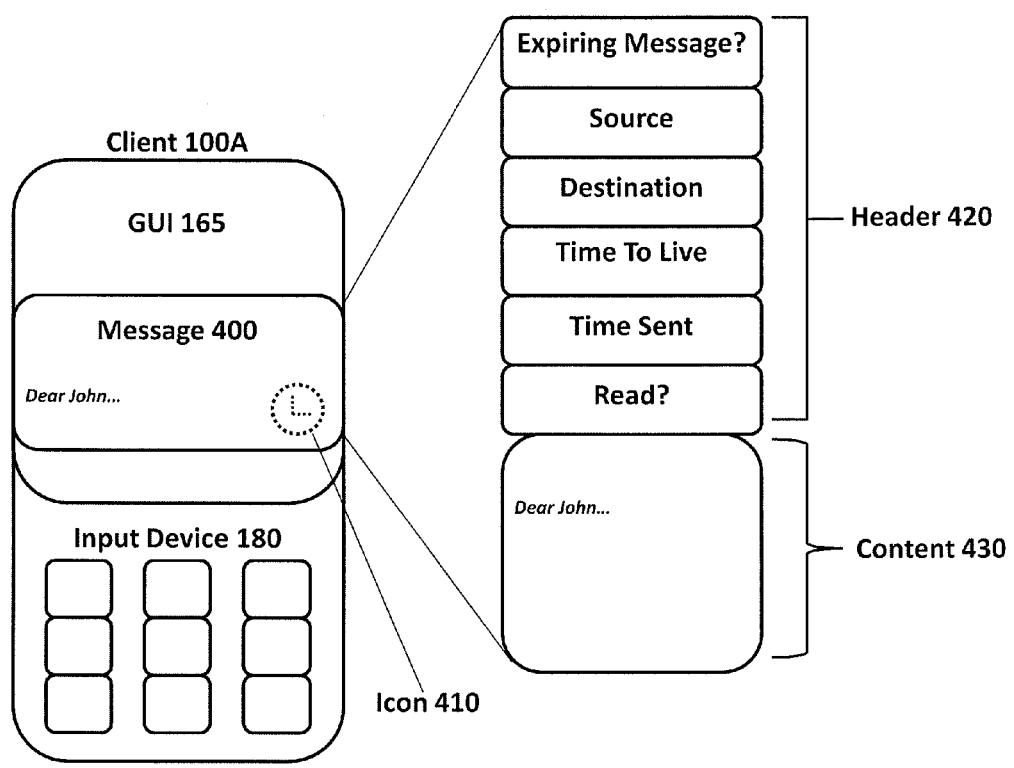
FIG. 4 is a block diagram illustrating an example user interface of a source client device displaying an expiring message.

Turning to FIG. 4, an example configuration of the client device 100A when it generates an expiring message is described. In this example, the client device 100A is operating as a source client. A user of the client device 100A interacts with the input device 180 and/or the GUI 165 to connect to a communications service, e.g., a mobile chat service, hosted by the service provider and to generate an expiring message 400. In some instances, the GUI 165 displays an application interface, which allows the user and interact with the application(s) 120 (FIG. 2) associated with client device 100A. In one embodiment, application(s) 120 include a mobile chat client. In some examples, the application interface is a graphical display that is not interactive.

Generating the message 400 includes, but is not limited to, identifying the message 400 as an expiring message, inputting a destination (e.g., username, email address) associated with a desired recipient of the message, and inputting the content of the message. In some instances, identifying the message 400 as an expiring message is achieved by actuating or selecting an off-the-record communications switch or dialog box displayed on the GUI 165. In some embodiments, generating the expiring message 400 additionally includes associating one or more expiration events with the message. For example, the user may interact with the input device 180 to input numbers representing a TTL of the expiring message.

The icon 410 of FIG. 4 may appear as a result of identifying the message 400 as an expiring message. Alternatively, the icon 410 is displayed after the expiring message is transmitted from the source client device 100A. In some instances, the icon 410 is an active representation of the expiration event. For example, when the expiring message is associated with a TTL, the icon 410 may depict a clock or timer that actively counts down until expiration of the TTL. Alternatively, when the content of the expiring message is limited to a predetermined number of views, the icon 410 may depict the remaining number of times the content can be viewed, updated after each view. Icon 410 is not limited to these examples and may be any icon indicating that the message 400 is an expiring message.

FIG. 4 depicts the expiring message 400 as including a header 420 and content 430. In this embodiment the header 420 includes information identifying the message as an expiring message (e.g., an expiring message flag), information identifying the source of the message (e.g., a username associated with the sender), information identifying the destination of the message (e.g., username, email address, telephone number, Jabber ID (JID), uniform resource identifier (URI), uniform resource locator (URL), etc. associated with the intended recipient), a TTL of the expiring message, the time and date of message transmission, and information indicating whether the content of the message 400 has been viewed or accessed by the destination (e.g., read flag). Time and date information may be obtained from a system clock associated with the processor(s) 101 and/or the operating system 108 of the client device 100A. Of course, the header 420 is not limited to the aforementioned information and may contain any data or property associated with the expiring message 400.

In some embodiments, the information contained in the header 420 is used by the service provider. For example, the server 300 of FIG. 3 may use the header 420 to determine expiration events associated with the expiring message, the destination of the expiring message 400, whether the message has been accessed by the destination client, and the like. In some embodiments, information contained in the header 420 is actively updated throughout the lifetime (e.g., from the message's creation or transmission to the occurrence of an expiration event associated with the message) of the expiring message 400.

Figure 5A:
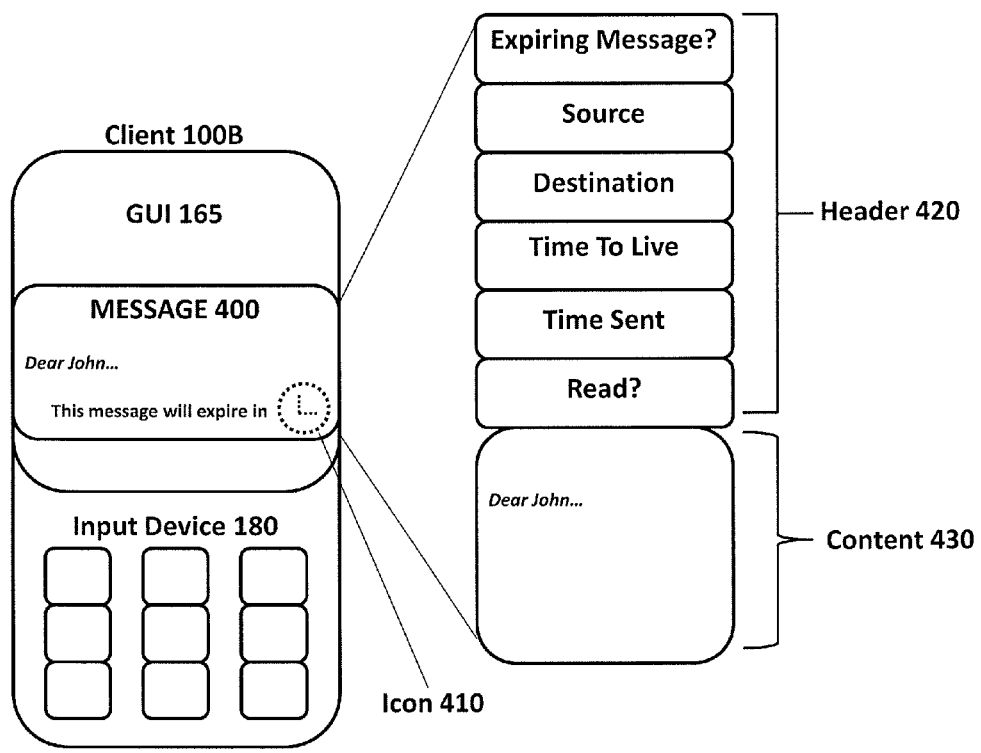
FIG. 5A is a block diagram illustrating an example user interface of a destination client device displaying an expiring message before an expiration event.

FIG. 5A illustrates an example user interface of the client device 100B when it receives an expiring message before an expiration event associated with the expiring message has occurred. In this example, the client device 100B is operating as a destination client. A user of the client device 100B interacts with the input device 180 and/or the GUI 165 to connect to the communications service 340 (FIG. 1), e.g., a mobile chat service, hosted by the service provider. In some instances, connecting to the communication service 340 demonstrates the destination client's ability and willingness to accept delivery of the expiring message 400. The GUI 165 displays an application interface, which allows the user to use and interact with the application(s) 120 (FIG. 2) associated with client device 100B. Again, application(s) 120 may include a mobile chat client.

As shown in FIG. 5A, when the expiring message 400 is delivered before an expiration event, the client device 100B may receive the same header 420 and content 430 of the expiring message as described in FIG. 4. Once received, the GUI 165 displays the content of the expiring message 400. In this example, the user of client device 100B can access and consume the content of expiring message 400 until an expiration event associated occurs. In some embodiments, the GUI 165 additionally displays the icon 410, indicating that the message is an expiring message. The icon 410 may be the same visual representation described in accordance with FIG. 4. In some embodiments, the client device 100B uses the information in the header 420. For example, the client device 100B may use the header 420 to determine expiration events associated with the expiring message. In another example, the client device 100B updates the icon 410 based on information extracted from the header 420. In this embodiment, as soon as or shortly after an expiration event associated with the expiring message 400 occurs, the client device 100B permanently deletes the content 430 of the expiring message 400. As described, the service provider also permanently deletes the content 430 of the expiring message 400 as soon as or shortly after the expiration event occurs.

Figure 5B:
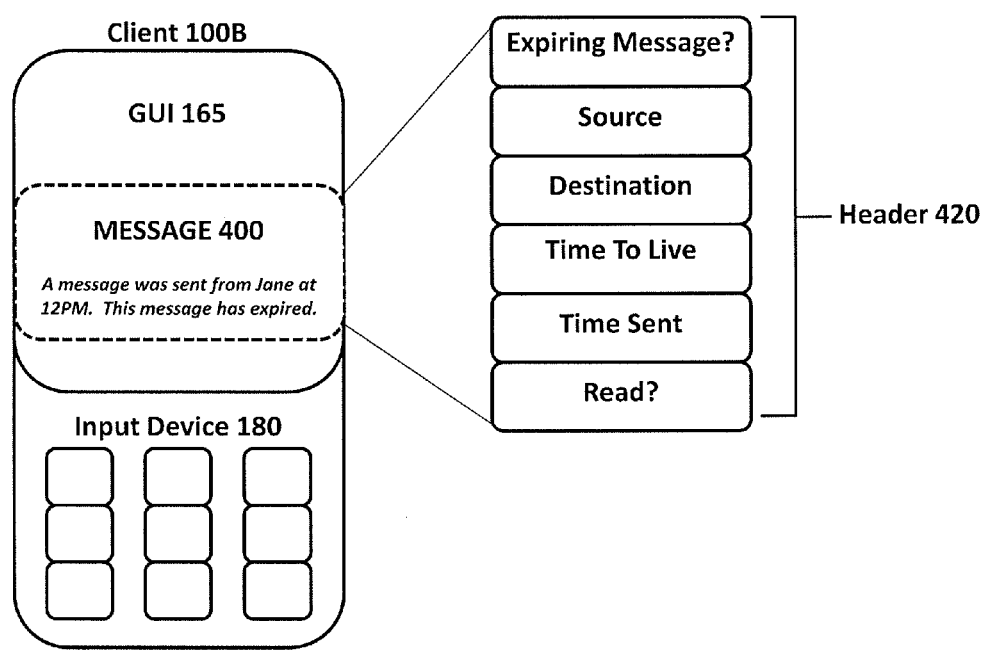
FIG. 5B is a block diagram illustrating an example user interface of a destination client device displaying an expiring message after an expiration event.

FIG. 5B illustrates an example user interface of the client device 100B after an expiration event associated with the expiring message occurs. Again, the client device 100B is operating as a destination client. In one scenario, the user interface depicted in FIG. 5B follows delivery, consumption, and deletion of the content 430 of the expiring message 400 by the client device 100B. In another scenario, the user interface depicted in FIG. 5B is displayed despite never receiving the content 430 of the expiring message 400 at the client device 100B. In either scenario, after an expiration event associated with the expiring message 400 occurs, the client device 100B only has access to the record of the expiring message 400. In FIG. 5B, the header 420 illustrates the record of the expiring message 400. The GUI 165 displays information or properties associated with the expiring message 400 to notify the user that the expiring message 400 existed but has expired. For example, the GUI 165 displays a notification in the following format: A message was sent by Sender at Time. This message has expired. Thus, the client device 100B of FIG. 5B may maintain a record of the expiring message 400, but cannot view or access the content 430 described in FIGS. 4 and 5A. Additionally, the user interface described in accordance with FIG. 5B may be displayed by the source client device 100A of FIG. 4 after an expiration event occurs.

In some embodiments, the GUI 165 of the client device 100B displays two or more expired messages as a single graphic. In these embodiments, a user of client device 100B is not required to scroll through many expired messages to locate and view other messages (e.g., non-expired messages and conventional messages). Additionally, the single graphic may be interactive. For example, the single graphic can be expanded to see properties of individual expired messages and then minimized into the single graphic thereafter.

Figure 6:
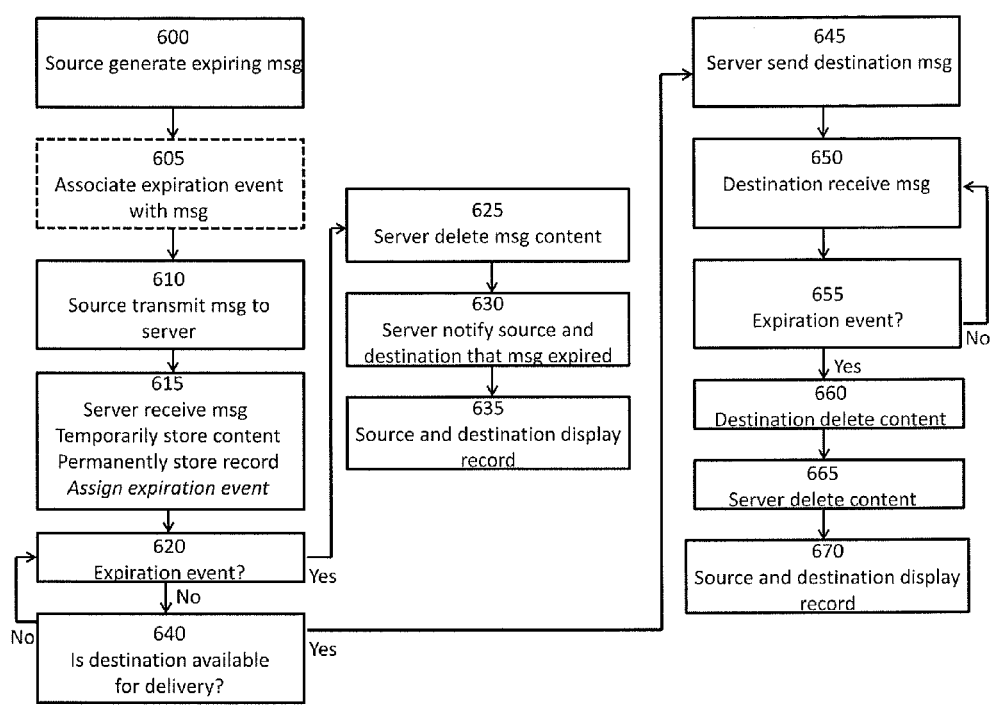
FIG. 6 is a flow diagram illustrating an example method for off-the-record communication.

Turning now to FIG. 6, one example method of an off-the-record communications environment, such as the off-the-record communications environment described in FIGS. 1-4, 5A, and 5B, is described.

Step 600: A source client generates an expiring message. In some embodiments, generating the message includes indicating that the message is an expiring message, inputting a destination (e.g., username, email address) associated with a desired recipient of the message, and inputting the content of the message.

Step 605 (optional): In some instances, the source client associates one or more expiration events with the expiring message. For example, the user of the source client may interact with an input device to input numbers representing a TTL of the expiring message.

Step 610: After initiating, composing, and addressing the expiring message to a specific destination, the source client transmits the expiring message. In some embodiments, transmitting the message includes establishing a connection between the source client and the communications service hosted by the server associated with the service provider. In other embodiments, this connection is established in one or more of the previous steps. Additionally, the source may display an icon or other visual representing an expiration event associated with the expiring message (e.g., a clock icon indicating a time to live).

Step 615: The server receives the expiring message. In this example, content of the expiring message is temporarily stored in non-durable memory. In some instances, non-durable memory is volatile memory. In another example, content of the expiring message is stored in a durable memory. However, when stored in durable memory, the service provider ensures that the content of the expiring message is only temporarily stored. Non-volatile memory is an example of durable memory. The record of the expiring message is permanently stored in durable memory.

The server may also determine the expiration event(s) associated with the expiring message. This may be accomplished by examining the record of the expiring message to determine expiration events defined by the source client. In some situations, the source client may not define an expiration event associated with the expiring message. In these situations, the server may assign one or more expiration events to the expiring message.

Step 620: The server monitors the expiring message and determines whether an expiration event occurs.

Step 625: In the case where an expiration event has occurred at step 620, the server permanently deletes the content of the expiring message from any and all storage media. Additionally, the server may update the record to reflect changes to the expiring message.

Step 630: The server notifies both the source and destination clients that the expiring message failed to be delivered. The server may transmit the record of the expiring message to either or both of the clients.

Step 635: In some instances, upon receiving notification from the server that the expiring message failed to be delivered, either or both clients display the envelope information of the expiring message.

Step 640: In the case where an expiration event has not occurred at step 620, the server either determines or is notified of the destination client's ability and willingness to connect to the communications service and to receive messages. If the destination client is unavailable and/or unwilling to accept delivery of the message, the server continues to monitor the expiring message and the destination client.

Step 645: In the situation where the destination client is available and willing to receive the expiring message before an expiration event associated with the expiring message occurs, the server transmits the expiring message to the destination client. In some instances, the server transmits both the record and the content of the expiring message. In other instances, the server transmits only the content of the expiring message and the destination client generates a record of the message.

Step 650: The destination client receives the content and, in some cases, the record of the expiring message. Thereafter, the destination client may temporarily access and consume the content of the message. In some embodiments, the source client is notified when the expiring message is delivered to the destination client. The destination client may display an icon or other visual representing an expiration event associated with the expiring message (e.g., a clock icon indicating a TTL).

Step 655: The server and the destination client monitor the expiring message and determine whether an expiration event occurs. If an expiration event has not occurred, the destination client may continue to access and consume the content of the expiring message.

Steps 660 and 665: In the case where an expiration event has occurred, both the server and the destination client permanently delete the content of the expiring message from any and all storage media. Additionally, either or both the server and the destination client may update the record to reflect changes to the expiring message.

Step 670: In some instances, both clients display the record information associated with the expiring message after an expiration event occurs.

Figure 7:
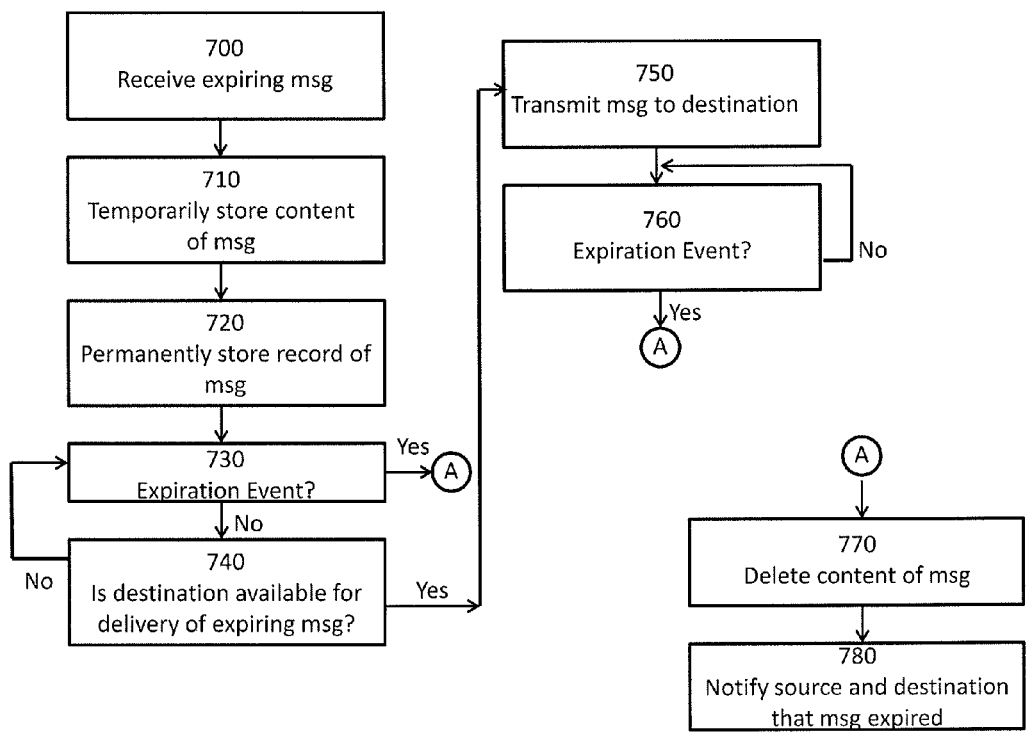
FIG. 7 is a flow diagram illustrating an example method for off-the-record communication at a server.

Turning to FIG. 7, an example embodiment of a method of off-the-record communication at a server, such as the server 300 of FIG. 3, is illustrated.

Step 700: The server receives an expiring message. The expiring message may be generated and transmitted to the server as described above.

Step 710: In this example, content of the expiring message is temporarily stored in non-durable memory. In some instances, non-durable memory is volatile memory. In another example, content of the expiring message is stored in a durable memory. However, when stored in durable memory, the service provider ensures that the content of the expiring message is only temporarily stored. Non-volatile memory is an example of durable memory.

Step 720: The record of the expiring message is permanently stored in durable memory. In any of steps 700-720, the server may determine the expiration event(s) associated with the expiring message. This may be accomplished by examining the record of the expiring message to determine expiration events defined by the source client. In some situations, the source client may not define an expiration event associated with the expiring message. In these situations, the server may assign one or more expiration events to the expiring message.

Step 730: The server monitors the expiring message and determines whether an expiration event has occurred.

Step 740: In the case where an expiration event has not occurred at step 730, the server either determines or is notified of the destination client's ability and willingness to connect to the communications service and receive messages. If the destination client is unavailable and/or unwilling to accept delivery of the message, the server continues to monitor the expiring message and the destination client.

Step 750: In the situation where the destination client is available and willing to receive the expiring message before an expiration event associated with the expiring message occurs, the server transmits the expiring message to the destination client. In some instances, the server transmits both the record and the content of the expiring message. In other instances, the server transmits only the content of the expiring message and the destination client generates a record of the message.

Step 760: The server continues to monitor the expiring message and determine whether an expiration event has occurred.

Step 770: In the case where an expiration event has occurred at either step 730 or step 760, the server permanently deletes the content of the expiring message from any and all storage media. Additionally, the server may update the record to reflect changes to the expiring message.

Step 780: The server notifies both the source and destination clients that an expiration event has occurred. The server may transmit the record of the expiring message to either or both of the clients.

Figure 8:
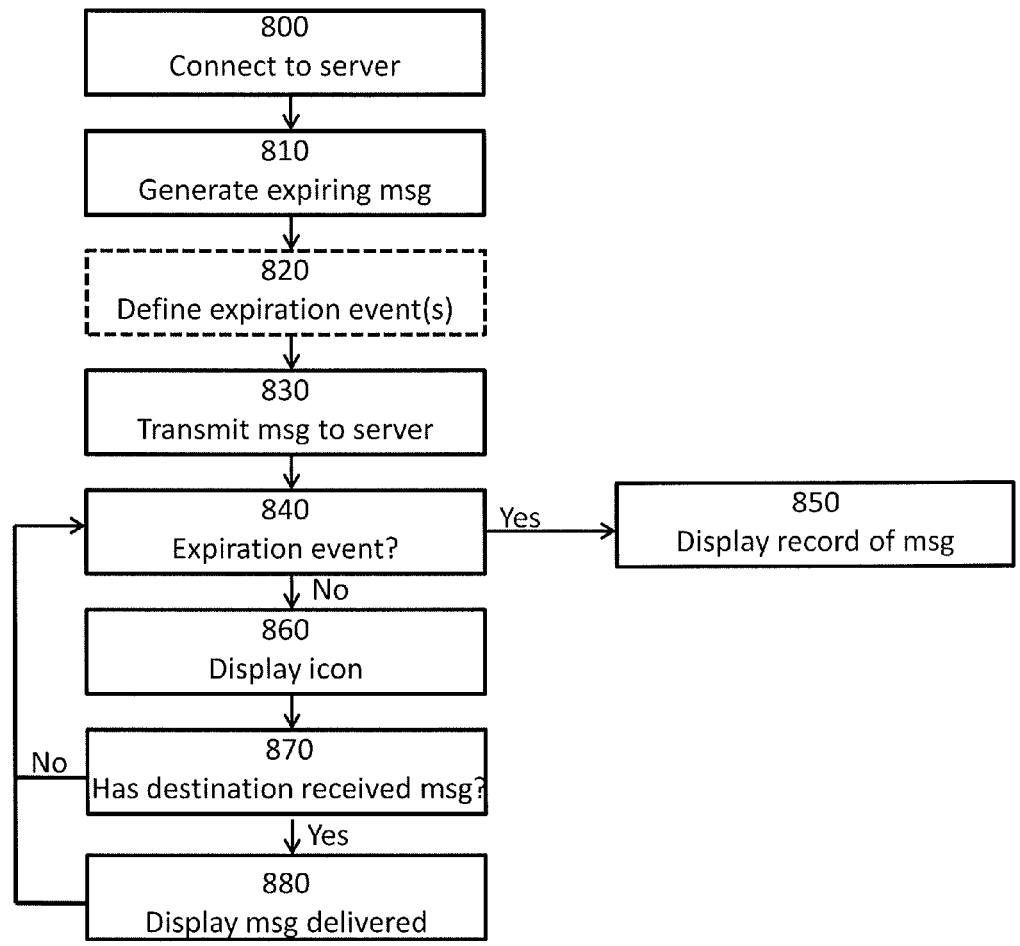
FIG. 8 is a flow diagram illustrating an example method for off-the-record communication at a source client.

The example embodiment of FIG. 8 describes a method of off-the-record communication at a source client, such as the client device 100A of FIGS. 1 and 4.

Step 800: The source client establishes a connection to the communications service hosted by the server at the service provider. In some instances, establishing a connection to the communications service is accomplished by manipulating the input device 180 and/or the GUI 165 of the client device 100A (FIG. 1) to interact with the application(s) 120 and/or the communications client 140 (FIG. 2).

Step 810: A source client generates an expiring message. In some embodiments, generating the message includes indicating that the message is an expiring message, inputting a destination (e.g., username, email address) associated with a desired recipient of the message, and inputting the content of the message.

Step 820 (optional): In some instances, the source client associates one or more expiration events with the expiring message. For example, the user of the source client may interact with an input device to input numbers representing a time to live of the expiring message.

Step 830: After initiating, composing, and addressing the expiring message to a specific destination, the source client transmits the expiring message. The source may display an icon or other visual representing an expiration event associated with the expiring message (e.g., a clock icon indicating a TTL).

Step 840: Either or both of the source client and the server monitor the expiring message and determine whether an expiration event has occurred. In the case where only the server monitors the expiring message, the server transmits a notification to the source client when an expiration event occurs.

Step 850: In the case where an expiration event has occurred at step 840, the source client displays the record of the expiring message.

Step 860: In the case where an expiration event has not occurred at step 840, the source client displays an icon or other visual representing an expiration event associated with the expiring message (e.g., a clock icon indicating a time to live).

Step 870: The source client determines whether the expiring message has been delivered to the intended recipient. This may be accomplished by receiving a delivery notification from the server, receiving a return message from the destination client acknowledging receipt of the expiring message, or the like.

Step 880: When the expiring message has been successfully delivered, the source client displays a message or notification indicating that the expiring message has been delivered to the destination.

Figure 9:
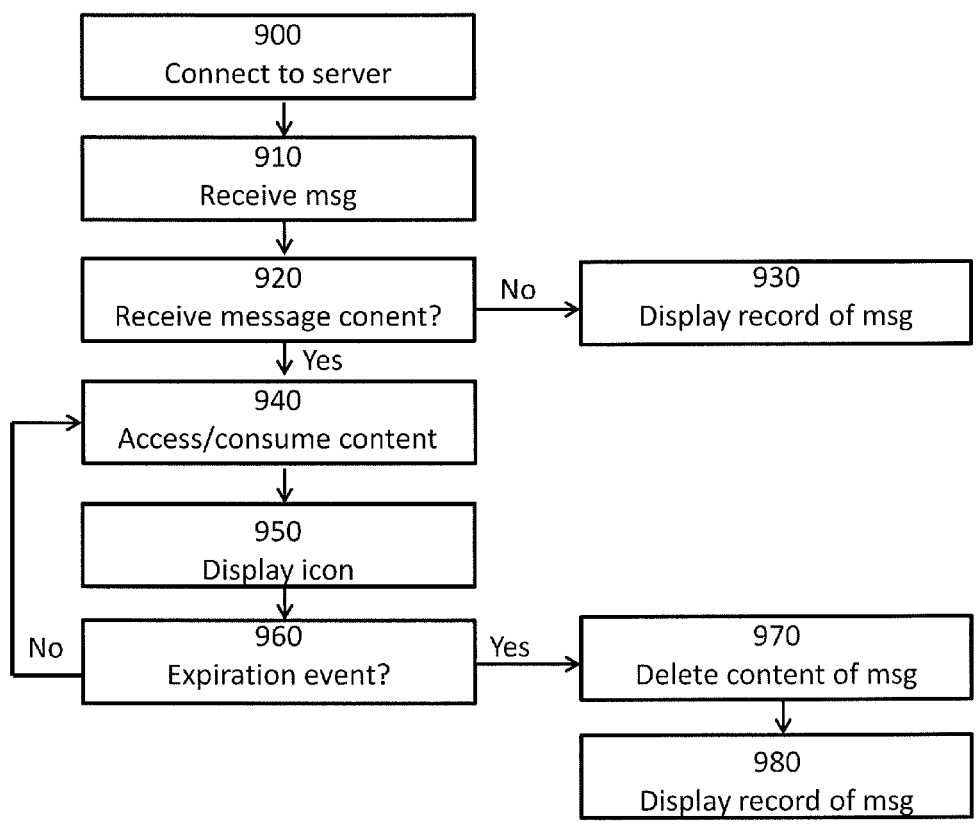
FIG. 9 is a flow diagram illustrating an example method for off-the-record communication at a destination client.

The example embodiment of FIG. 9 describes a method of off-the-record communication at a destination client, such as the client device 100B of FIGS. 1, 5A, and 5B.

Step 900: The destination client establishes a connection to the communications service hosted by the server at the service provider. In some instances, establishing a connection to the communications service is accomplished by manipulating the input device 180 and/or the GUI 165 of the client device 100B (FIG. 1) to interact with the application(s) 120 and/or the communications client 140 (FIG. 2).

Step 910: When an expiring message addressed in a manner to be available to the destination client resides at the server, the server monitors the expiring message and determines whether an expiration event has occurred. In the case where an expiring message for the destination client resides at the server and an expiration event has occurred, the destination client may receive a notification from the server regarding the expiring message but does not receive the content of the message. Alternatively, where an expiring message for the destination client resides at the server and an expiration event has not occurred, the content of the expiring message is delivered to the destination client.

Step 920: The destination client determines whether the content of the expiring message was received.

Step 930: In the case where the destination client is notified of an expiring message but does not receive the message's content, i.e., an expiration event occurred before the expiring message was delivered to the destination client, the destination client displays a record of the expiring message. In some embodiments, the record may be included in the notification received from the server. In other embodiments, the destination client generates a record based upon information received from the server.

Step 940: In the case where the destination client receives the content of the expiring message at step 920, the destination client may temporarily access and consume the content. In some embodiments, the destination client temporarily stores the content of the expiring message in a non-durable memory. In some embodiments, the destination client may receive both the content and the record of the expiring message. In other embodiments, the destination client generates a record based upon information received from the server.

Step 950: The destination client may display an icon or other visual representing an expiration event associated with the expiring message (e.g., a clock icon indicating a TTL).

Step 960: The destination client monitors the expiring message and determines whether an expiration event occurs. If an expiration event has not occurred, the destination client may continue to access and consume the content of the expiring message.

Steps 970 and 980: In the case where an expiration event has occurred, the destination client permanently deletes the content of the expiring message from any and all storage media. Additionally, the destination client may update and/or display the record to reflect changes to the expiring message.

Figure 10:
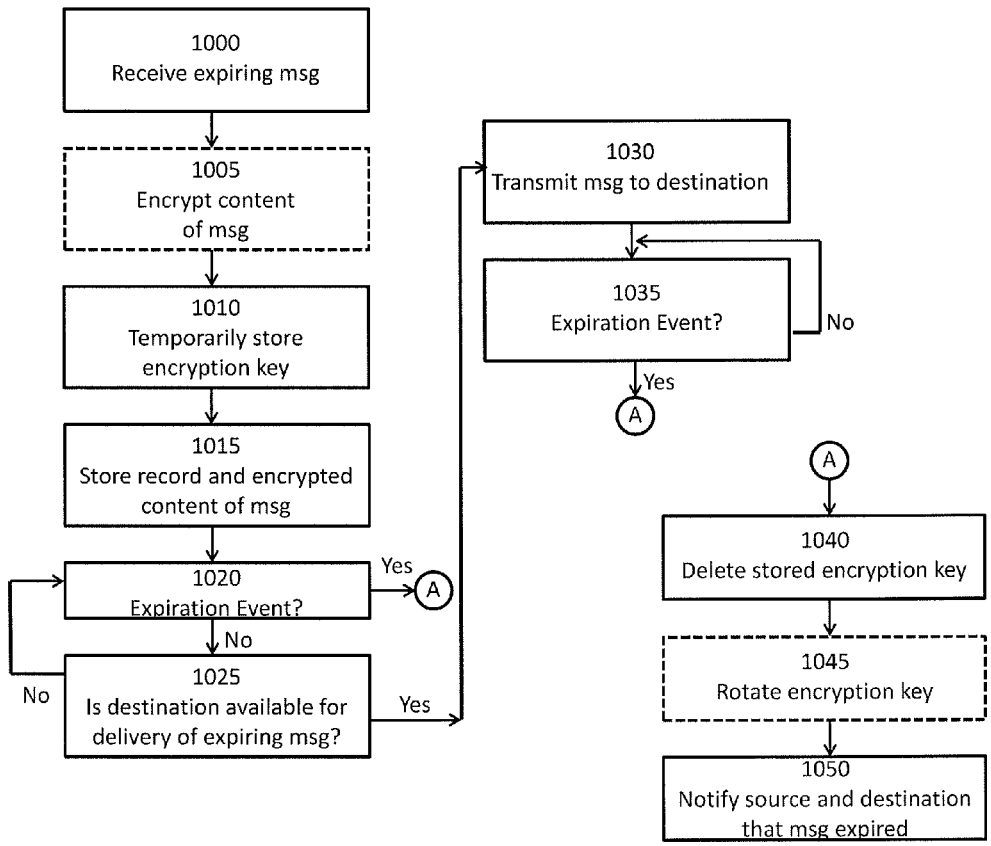
FIG. 10 is a flow diagram illustrating another example method for off-the-record communication at a server.

FIG. 10 illustrates another example embodiment of a method of off-the-record communication at a server, such as the server 300 of FIG. 3.

Step 1000: The server receives an expiring message.

Step 1005 (optional): In some instances, the server applies an encryption algorithm to the expiring message to encrypt the message's content and generates an encryption key that can be used to decrypt the message's content. The encryption algorithm may be a rotating key encryption algorithm and key generation and/or rotation may be random. In some instances, the encryption key may be activated through the use of a user friendly passcode, such passcode being set in any acceptable manner such as randomly or by a user. In other cases, encryption is executed at the source client. In these cases, the expiring message received by the server at step 1000 includes encrypted message content and an encryption key associated with the encrypted content.

Step 1010: In this example, the encryption key associated with the encrypted message content is temporarily stored in non-durable memory. In some instances, non-durable memory is volatile memory.

Step 1015: The record of the expiring message is permanently stored in durable memory. The encrypted content of the message may be either permanently or temporarily stored. In any of steps 1000-1015, the server may determine the expiration event(s) associated with the expiring message. This may be accomplished by examining the record of the expiring message to determine expiration events defined by the source client. In some situations, the source client may not define an expiration event associated with the expiring message. In these situations, the server may assign one or more expiration events to the expiring message.

Step 1020: The server monitors the expiring message and determines whether an expiration event has occurred.

Step 1025: In the case where an expiration event has not occurred at step 1020, the server either determines or is notified of the destination client's ability and willingness to connect to the communications service and receive messages. If the destination client is unavailable and/or unwilling to accept delivery of the message, the server continues to monitor the expiring message and the destination client.

Step 1030: In the situation where the destination client is available and willing to receive the expiring message before an expiration event associated with the expiring message occurs, the server transmits the expiring message to the destination client. In this case, the server transmits, at least, the encrypted message content and the encryption key that can be used to decrypt the content. In some examples, the encryption key may be transmitted separately. In other instances, the encryption key may be activated by a user friendly passcode determined in any acceptable manner such as by the user or randomly. The passcode may be transferred to the user in any manner, e.g., verbally, by electronic communication, etc. The server may also transmit the record of the expiring message. Alternatively, the server does not transmit the record and the destination client generates a record of the message.

Step 1035: The server continues to monitor the expiring message and determine whether an expiration event has occurred.

Step 1040: In the case where an expiration event has occurred at either step 1020 or step 1035, the server permanently deletes the encryption key associated with the encrypted content of the expiring message from any and all storage media. The server may also delete the encrypted content from any and all storage media. Additionally, the server may update the record to reflect changes to the expiring message.

Step 1045 (optional): In situations where the server applies the encryption algorithm to the expiring message to encrypt the message's content and generates an encryption key that can be used to decrypt the message's content, the server also rotates the encryption key. Encryption key rotation may be random. In these situations, key rotation may occur any time between encrypting the expiring message content (step 1005) and the occurrence (or shortly after) of an expiration event associated with the expiring message (e.g., step 1045).

Step 1050: The server notifies both the source and destination clients that an expiration event has occurred. The server may transmit the record of the expiring message to either or both of the clients.

Note that, while client device 100A is described as a source client device and client device 100B is described as a destination client device, both client devices 100A and 100B can function as either or both source and destination clients.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the embodiments and does not pose a limitation on the scope of the invention unless otherwise claimed. No language in the specification should be construed as indicating any non-claimed element as essential to the practice of the invention.

Embodiments of this invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of off-the-record communication including expiring messages, the method comprising:
   receiving, at a server, an electronic communication from a source device, the electronic communication including at least one expiring message;
   temporarily storing, at the server, content of the expiring message in a non-durable memory for a predetermined amount of time;
   durably storing, at the server, envelope information associated with the expiring message in a durable memory apart from the content of the expiring message that is stored in the non-durable memory;
   determining whether a recipient device for the expiring message is available to accept transmission of the expiring message and determining whether an expiration event has occurred; and
   transmitting information to the recipient device, wherein the transmitted information is contingent upon the determination of whether an expiration event has occurred and includes one of the group consisting of:
the content of the expiring message when the recipient device is available to accept transmission of the expiring message before the expiration event has occurred, and
the envelope information of the expiring message when the recipient device is not available to accept transmission of the expiring message until after the expiration event has occurred.

2. The method of claim 1, further comprising:
permanently deleting the content of the expiring message from the server after the expiration event has occurred.

3. The method of claim 1, wherein the expiration event is one of the group consisting of:
an elapsing of a predetermined time to live indicating an amount of time the content of the expiring message is stored at the server, and
viewing the expiring message a predetermined number of times.

4. The method of claim 1, further comprising:
transmitting a notification to the source device after the content of the expiring message is transmitted to the recipient device indicating that the expiring message was delivered.

5. The method of claim 1, wherein the expiring message of the electronic communication consists of a mobile chat.

6. The method of claim 1, wherein the envelope information comprises information indicating
a source of the expiring message, and
a time of transmission of the expiring message by the source device.

7. The method of claim 6, wherein the envelope information consists of a time of transmission by the source device of the expiring message.

8. A system for off-the-record communication including expiring messages, the system comprising:
first and second client devices configured to transmit and receive electronic communications including at least one expiring message;
a server comprising,
a reception unit configured to receive the expiring message from the first client device;
a transmission unit configured to transmit information associated with the expiring message to the second client device, wherein the transmitted information is contingent upon a determination of whether an expiration event has occurred;
a non-durable memory medium connected to the reception unit and configured to temporarily store content of the expiring message; and
a durable memory medium connected to the reception unit and the transmission unit, and configured to durably store envelope information associated with the expiring message apart from the content of the expiring message that is stored in the non-durable memory, wherein
the content of the expiring message is temporarily stored in the non-durable memory until occurrence of an expiration event, and
the content of the expiring message is permanently deleted from the server upon occurrence of the expiration event.

9. The system of claim 8, wherein the expiration event is one of the group consisting of:
expiration of a predetermined time to live indicating an amount of time the content of the expiring message is stored at the server, and
viewing the content of the expiring message a predetermined number of times by the second client device.

10. The system of claim 8, wherein the first client device comprises an input device configured to receive user input defining the expiration event.

11. The system of claim 8, wherein the envelope information comprises a time of transmission by the first client device of the expiring message.

12. The system of claim 8, wherein each of the first and second client devices comprise a display device configured to display a visual associated with the expiration event until the expiration event has occurred.

13. The system of claim 12, wherein the visual is one of the group consisting of: a time to live icon and a number indicating a number of times the content can be viewed.

14. The system of claim 12, wherein the display devices are further configured to display the envelope information associated with the expiring message after the expiration event has occurred.

15. The system of claim 8, wherein the second client device comprises a storage medium for temporarily storing the content of the expiring message, and the content of the expiring message is permanently deleted from the storage medium after the expiration event has occurred.

16. The system of claim 8, wherein the server hosts an electronic communications service consisting of a mobile chat service.

17. The system of claim 8, wherein the envelope information comprises information indicating one of the group consisting of:
a source of the expiring message,
time of transmission of the expiring message by the first client device, and
a predetermined time to live indicating an amount of time content of the expiring message is stored at the server.

* * * * *